US012581263B2

(12) United States Patent
Berger et al.

(10) Patent No.: US 12,581,263 B2
(45) Date of Patent: Mar. 17, 2026

(54) METHOD FOR MANAGING AN AUDIO STREAM USING AN IMAGE ACQUISITION DEVICE AND ASSOCIATED DECODER EQUIPMENT

(71) Applicant: SAGEMCOM BROADBAND SAS, Rueil Malmaison (FR)

(72) Inventors: Jérôme Berger, Rueil Malmaison (FR); Gilles Bourgoin, Rueil Malmaison (FR); Arnaud Lucas De Couville, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 270 days.

(21) Appl. No.: 18/339,753

(22) Filed: Jun. 22, 2023

(65) Prior Publication Data

US 2023/0421986 A1 Dec. 28, 2023

(30) Foreign Application Priority Data

Jun. 22, 2022 (FR) ...................................... 2206211

(51) Int. Cl.
*H04S 7/00* (2006.01)

(52) U.S. Cl.
CPC .................................... *H04S 7/303* (2013.01)

(58) Field of Classification Search
CPC ........................................................ H04S 7/303
See application file for complete search history.

(56) References Cited

U.S. PATENT DOCUMENTS

| | | | | |
|---|---|---|---|---|
| 2013/0121515 | A1 | 5/2013 | Hooley et al. | |
| 2017/0188170 | A1* | 6/2017 | Prins ........................ | H04S 7/303 |
| 2018/0020311 | A1 | 1/2018 | Liu et al. | |
| 2019/0075418 | A1 | 3/2019 | Shi et al. | |
| 2020/0202856 | A1 | 6/2020 | Ivanov Bonev et al. | |
| 2022/0169186 | A1* | 6/2022 | Laury ..................... | H04S 7/303 |

* cited by examiner

*Primary Examiner* — Ping Lee
(74) *Attorney, Agent, or Firm* — MUNCY, GEISSLER, OLDS & LOWE, P.C.

(57) ABSTRACT

A method for managing an audio stream read by an audio playback equipment unit, said unit being arranged in a given place, includes the steps of: detecting on at least one image, the user(s) present on the image and deducing from this, for each of said users, at least one piece of information characteristic of the position of the user in question in said image; determining at least from the different characteristic information, an optimal bearing angle (βopt); and providing mixing means distributing the audio stream between the different audio playback equipment of the unit, a magnitude characteristic of the optimal bearing angle, such that the mixing means distribute the audio stream at least according to said value.

15 Claims, 3 Drawing Sheets

METHOD FOR MANAGING AN AUDIO STREAM USING AN IMAGE ACQUISITION DEVICE AND ASSOCIATED DECODER EQUIPMENT

The invention relates to the field of audio playback via an audio playback equipment unit.

BACKGROUND OF THE INVENTION

Today, it is common, in modern domestic multimedia installations, to connect an audio playback equipment unit comprising different audio playback equipment to decoder equipment, with the aim of improving the acoustic experience of a user. Indeed, the user is thus more "surrounded" in the sound broadcast by the audio playback equipment unit, than if said sound was broadcast by one single piece of audio playback equipment.

Usually, the audio playback equipment unit is connected to mixing means which make it possible to distribute the channels of a multichannel audio stream received by the decoder equipment, between the different audio playback equipment.

The Dolby ATMOS (registered trademark) system thus optimises the rendering of the multichannel sound according to the arrangement of the audio playback equipment with respect to a theoretical listening position of the user in the room. For example, if the audio playback unit comprises two pieces of audio playback equipment arranged to the right and to the left of the decoder equipment, the system will consider that the user is located between the two pieces of audio playback equipment.

Thus, this type of system does not consider the actual position of the user. Subsequently, the acoustic experience of the user is only, in reality, of good quality, if the user is close to the theoretical listening position.

AIM OF THE INVENTION

An aim of the invention is to propose a method for managing an audio stream which makes it possible to improve the acoustic experience of the user.

An aim of the invention is to propose a corresponding piece of decoder equipment.

SUMMARY OF THE INVENTION

In view of achieving this aim, a method for managing an audio stream read by at least one audio playback equipment unit is proposed, comprising at least two pieces of audio playback equipment, said unit being arranged in a given place.

According to the invention, the method comprises at least the steps of:

- Detecting on at least one image acquired by at least one image acquisition device of the given place, the user(s) present on the image and deducing from this, for each of said users, at least one piece of information characteristic of the position of the user in question in said image,
- Determining at least from different characteristic information, an optimal bearing angle formed between:
  - An axis of the image acquisition device, and
  - An axis along which a sound played back by the audio playback equipment unit is propagated to reach the different users who were present on the image,
- Providing mixing means distributing the audio stream between the different audio playback equipment of the unit, a magnitude characteristic of the optimal bearing angle, such that the mixing means distribute the audio stream at least according to said value.

In this way, the invention makes it possible to be adapted to the actual positions of the users present in the given place, including in the case where there are several users. By providing a bearing angle value linked to the actual position of the different users in the given place, the mixing means can adapt the audio stream so as to improve the acoustic experience of the different users.

The invention therefore makes it possible to obtain a spatialized acoustic rendering adapted to the position of the users present in the given place.

Advantageously, the invention does not require the calibration step prior to the use of the sound playback equipment unit.

Optionally, the image acquisition device generates, at regular intervals, a new image of the given place, and the optimal bearing angle value is recalculated for each new image, such that the mixing means distribute the audio stream between the different audio playback equipment of the unit, based on this new optimal bearing angle value.

Thus, the invention is dynamically adapted to the different users. The invention makes it possible, in particular, to consider not only the actual position of the users, but also the present of several users, but also the movement of said users.

This makes it possible to further improve the acoustic experience of the users.

Thus, a spatialized acoustic rendering is obtained, dynamically adapted to the position of the users present in the given place.

Optionally, the characteristic information is at least an x-axis in the image.

Optionally, the characteristic information is a piece of information characteristic of the position of the face of the user in the image.

Optionally, the optimal bearing angle is linked to an average position of the different users appearing on the image.

Optionally, the optimal bearing angle is linked to a spatial average of the position of the different users appearing on the image or to an angular average of the position of the different users appearing on the image or to the positions of two users farthest away from one another on the image.

Optionally, also a dispersion angle is estimated, which characterises the dispersion of the different users present on the image and a magnitude characteristic of the dispersion angle is provided to the mixing means, such that the mixing means distribute the stream at least according to said value.

Optionally, the audio stream is a multichannel audio stream and the audio playback equipment unit comprises at least one piece of audio playback equipment less than the number of channels of the multichannel audio stream.

Optionally, the optimal bearing angle is estimated also by considering the attention of the users present on the image.

Optionally, the orientation of the head of the users present on the image is considered to determine the optimal bearing angle $\beta_{opt}$.

Optionally, a potential sleepiness of the users present on the image is considered to determine the optimal bearing angle $\beta_{opt}$.

Optionally, the mobility of the users present on the image is considered for managing the audio stream.

Optionally, also, the distance of the users to the installation is also provided to the mixing means.

Optionally, the mixing means distribute the audio stream between the different audio playback equipment of the unit by being based on one or more sets of at least one precalculated audio parameter.

Optionally, the audio stream is a multichannel audio stream and the audio playback equipment unit comprises at least one piece of audio playback equipment less than the number of channels of the multichannel audio stream.

The invention also relates to an installation making it possible to implement the method such as specified above, comprising at least two pieces of audio playback equipment, means for receiving at least one audio stream, the mixing means making it possible to distribute the channel(s) of the audio stream between the audio playback equipment, an image acquisition device and means for analysing at least one image provided by the image acquisition device.

Optionally, the installation is decoder equipment.

The invention also relates to a computer program comprising instructions which make an installation such as specified above execute the method such as specified above.

The invention also relates to a computer readable storage medium on which the computer program such as specified above is recorded.

Other features and advantages of the invention will emerge upon reading the following description of particular non-limiting embodiments of the invention.

BRIEF DESCRIPTION OF THE DRAWINGS

The invention will be best understood in the light of the following description, in reference to the accompanying figures, among which.

DETAILED DESCRIPTION OF THE INVENTION

Figure 1:
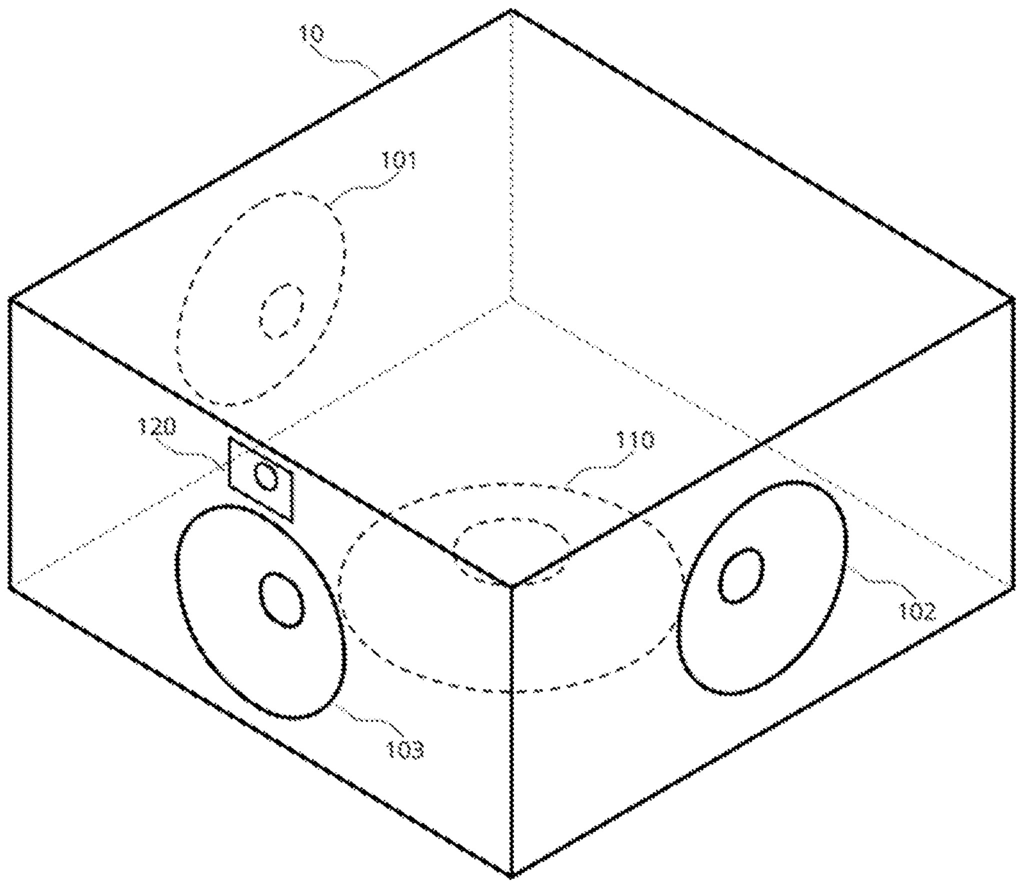
FIG. 1 represents an installation according to a first embodiment of the invention.
Figure 2:
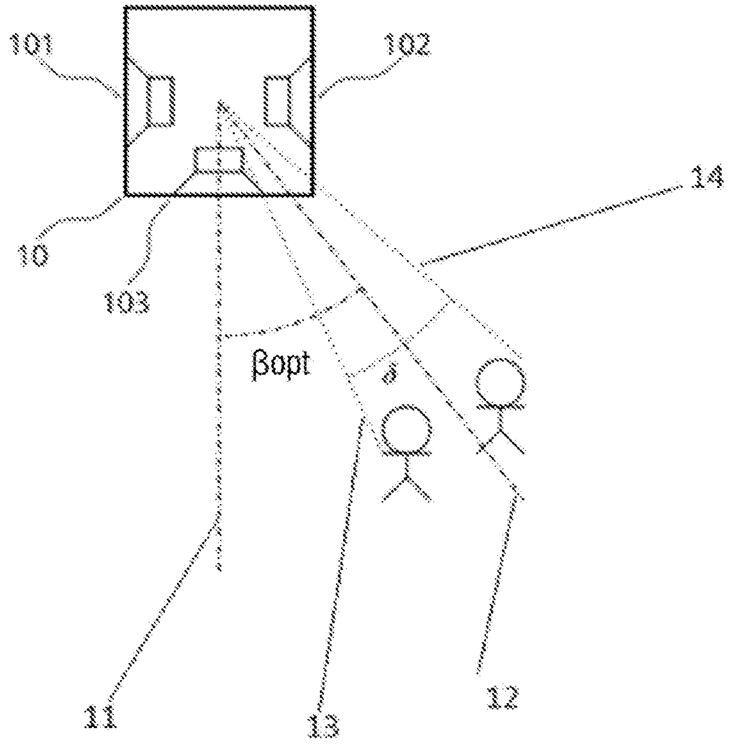
FIG. 2 is a schematic top view of a given place integrating the installation such as illustrated in FIG. 1, two users being present in the given place.

In reference to FIGS. 1 and 2, the installation according to a first embodiment is an installation comprising an audio system connected to an audio playback equipment unit. The installation is arranged in a given place and, for example, in a room of a house.

The installation is therefore intended at least to broadcast the sound to the users present in the room.

The audio system is, for example, a Hi-Fi channel or decoder equipment 10.

The audio playback equipment unit is, for example, integrated in the audio system.

For example, the decoder equipment 10 is a set-top box. Optionally, the set-top box is a television set-top box. For example, the television set-top box is a VSB (Video Sound Box) (registered trademark) television set-top box, and for example a VSB4 television set-top box.

The decoder equipment 10 comprises a communication interface, interface thanks to which the decoder equipment acquires, in service, at least one incoming audio stream, and for example, an incoming audio/video stream, which can come from one or more broadcast networks. The broadcast networks can be of any type. Thus, according to a first variant, the broadcast network is a satellite television network, and the decoder equipment 10 receives the incoming stream through a parabolic antenna. According to a second variant, the broadcast network is an internet connection and the decoder equipment 10 receives the incoming stream through said internet connection. According to a third variant, the broadcast network is a digital terrestrial television (DTT) network or a cable television network. Mainly, the broadcast network can be of various sources: satellite, cable, IP, DTT (Digital Terrestrial Television network), locally stored audio/video stream, etc.

The decoder equipment 10 is therefore optionally provided with an output enabling it to be connected to video or audio/video playback equipment such as a television which is therefore, in this case, external to said decoder equipment 10.

Moreover, the decoder equipment 10 is provided with processing means, among others, making it possible to process the incoming stream. For example, the processing means comprise a processor and/or a computer and/or a microcomputer, etc. In the present case, the processing means comprise a processor.

The audio playback equipment is, for example, speakers integrated with the decoder equipment 10. According to a particular embodiment, the decoder equipment 10 comprises at least two speakers and, for example, at least three speakers and, for example, at least four speakers. Optionally, the decoder equipment 10 is equipped with three speakers 101, 102, 103 arranged on three successive flanks of the decoder equipment and with a fourth speaker 110 arranged on the bottom of the decoder equipment 10. The three speakers 101, 102, 103 of the flanks are broadband, while the speaker of the bottom 110 is dedicated to low frequency playback. This four-speaker configuration is commonly called "3.1 system".

Moreover, the installation comprises mixing means making it possible to distribute at least one channel of the incoming stream between the different audio playback equipment 101, 102, 103, 110. This makes it possible to generate a spatialization effect for the user(s) present in the room.

Optionally, the audio stream of the incoming stream is a multichannel audio stream and the audio playback equipment unit comprises at least one piece of audio playback equipment less than the number of channels of the multichannel audio stream. For example, the audio stream is a five-channel stream.

Preferably, the mixing means are integrated in the decoder equipment 10. For example, the mixing means are integrated in the processing means.

Particularly, the mixing means comprises a memory on which a market library is stored and/or communicate remotely (via, for example, the communication interface of the decoder equipment) with a market library. The market library is, for example, the Dolby ATMOS (registered trademark) library.

Such a library makes it possible for the mixing means to ensure the distribution of the stream from incoming data indicated in the library.

Such mixing means (and the associated library) are already known from the prior art and usually make it possible to distribute the channels of the audio stream between the different audio playback equipment according to incoming data provided by the user having disposed the installation in the room during the initialisation of the audio playback equipment.

In the scope of the invention, the incoming data will be provided directly by the installation itself, for example by the decoder equipment 10, to the mixing means. These incoming data will be described below.

According to another aspect, the installation comprises an image acquisition device 120. The image acquisition device 120 is, for example, integrated in the decoder equipment 10. The image acquisition device 120 is, for example, arranged at the flank carrying the audio playback equipment 103 and framed by the two other flanks also carrying the audio playback equipment 101, 102. The image acquisition device 120 is thus centred in the decoder equipment 10.

The decoder equipment 10 is arranged, such that its flank carrying the image acquisition device 120 is rotated towards the given place, in this case, that is inside the room. The image acquisition equipment 120 is, for example, a camera.

The installation moreover comprises image analysis means. Said means are, for example, integrated in the decoder equipment 10 and, for example, integrated in the processing means of the decoder equipment 10.

The image analysis means are configured to analyse at least one image provided by the image acquisition device 120, by detecting at least one piece of information characteristic of the position of each of the users present on the image and transmitting this position information (i.e. the abovementioned incoming data) to the mixing means such that said mixing means can distribute the channels of the audio stream between the audio playback equipment in view of this information.

Figure 3:
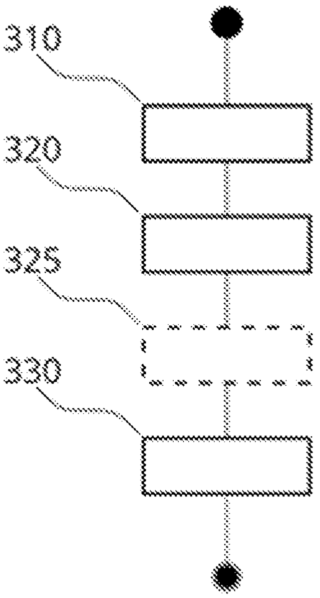
FIG. 3 schematically illustrates the main steps implemented by the installation illustrated in FIG. 1 to manage an audio stream received by said installation.

In reference to FIG. 3, a particular implementation of a method for managing the audio stream by the installation described above will now be detailed.

During the previous step, the image acquisition device 120 acquires at least one image of the room.

During a first step 310, the image analysis means detect on the image, the user(s) present on the image. For example, the analysis means detect the faces present on the image to detect the users.

The analysis means (or other installation means, like, for example, the processing means) deduce from this, for each of said users, at least one piece of information characteristic of the position of the user in question in said image and therefore in this case, the position of the face of the user.

According to a first option, the installation (in this case, the decoder equipment) is based on the Viola-Jones method, which is a known algorithm making it possible to detect faces in an image. This algorithm takes an incoming image and produces a list of rectangles surrounding each detected face. For example, the following web page can be referred to for more details https://fr.wikipedia.org/wiki/M%C3%A9thode_de_Viola_et_Jones or the article Paul Viola and Michael Jones, "*Rapid Object Detection using a Boosted Cascade of Simple Features*", IEEE CVPR, 2001.

For example, the rectangle surrounds the face and in particular, the coordinates of the eyes, the nose and the mouth.

According to a second option, the installation (in this case, the decoder equipment) is based on a neural network to detect the position of the faces in the image. The neural network is, for example, integrated in the decoder equipment and, for example, in the analysis means and/or in the processing means. The neural network is, for example, the BlazeFace (registered trademark) or MobileNet (registered trademark) neural network. For more details relating to BlazeFace, the following article can be referred to, for example BlazeFace: *Sub-millisecond Neural Face Detection on Mobile GPUs*, V. Bazarevsky, Y. Kartynnik, A. Vakunov, K. Raveendran, M. Grundmann—Computing Research Repository—2019 (https://arxiv.org/abs/1907.05047). For more details relating to MobileNet, the following article can be referred to, for example *MobileNets: Efficient Convolutional Neural Networks for Mobile Vision Applications*, A. G. Howard, M. Zhu, B. Chen, D. Kalenichenko, W. Wang, T. Weynand, M. Andreetto, H. Adam —Computing Research Repository—2017 (https://arxiv.org/abs/1704.04861).

The neural network takes an incoming image and produces a list of rectangles surrounding each detected face. For example, the rectangle encompasses the face, as well as the coordinates of the eyes, the nose and the mouth.

When the scope of the first option, the second option or another option is analysed to detect the faces of the users, the installation (and, for example, the decoder equipment) then constructs a list of positions of the faces in the image, by taking the coordinates of a given point in each detected rectangle. The information characteristic of the position of the users present on the image is therefore the coordinates (x-axis, y-axis), coordinates linked to the baseline of the image.

For example, the installation constructs a list of positions of the faces in the image, by taking the coordinates of the centre of each detected rectangle. In a variant, the installation constructs a list of positions of the faces in the image, by taking the coordinates of the barycentre of a triangle formed by the positions of the eyes and the mouth in said rectangle.

The first step 310 described thus makes it possible to establish a list of positions of the faces in the image comprising, for each face, a set of coordinates linked to the face in the image. More specifically, the list is a list of positions of faces detected in the image, each position being represented by a pair (x,y) of values representing the coordinates in pixels of the point associated with the face in the image.

Below, to simplify the following formulas, it is assumed that the coordinate point (0, 0) corresponds to the centre of the image. However, this assumption is not limiting, and the coordinate point (0, 0) can correspond to point of the image other than its centre, like for example, one of the corners of the image.

During a second step 320, the installation (and more specifically in this case, the decoder equipment 10) determines from the list of coordinates established in the first step 310, an optimal bearing angle $\beta_{opt}$ defined by the angle formed between:

- A first axis 11 of the image acquisition device 120, and
- A second axis 12 according to which a sound played back by the audio playback equipment unit is propagated to reach the different users who were present on the image.

It is reminded that, generally, a bearing angle means an angle between the first axis 11 of the image acquisition device 120 and another second axis 12 belonging to the same horizontal plane as the first axis 11 of the image acquisition device 120.

FIG. 2 represents such a bearing angle $\beta_{opt}$. This is an angle extending between the two abovementioned axes, said axes moreover belonging to one same horizontal plane.

The optimal bearing angle $\beta_{opt}$ preferably defines the direction (the second axis 12), wherein it is sought that the sound broadcast by the audio playback unit has a maximum quality.

The optimal bearing angle $\beta_{opt}$ is such that the second axis 12 is preferably mainly directly towards the centre of a unit formed by the different users appearing on the image.

Preferably, the optimal bearing angle $\beta_{opt}$ is linked to an average position of the different users appearing on the image.

According to a first option, the optimal bearing angle $\beta_{opt}$ is determined from a spatial average of the position of the different users appearing on the image. An x-axis average $\overline{x}$ linked to each of the faces detected on the image is calculated.

The optimal bearing angle is thus given by the formula:

$$\beta_{opt} = \tan^{-1}\left(\frac{2\overline{x}}{W}\tan\frac{\alpha}{2}\right)$$

Where:

$\beta_{opt}$ means the optimal bearing angle,

W means the width of the image acquired in pixels (typically, W=1920), and $\alpha$ means the angle of the field of the image acquisition device 120 in a horizontal plane (typically, $\alpha$=120°).

According to a second option, the optimal bearing angle $\beta_{opt}$ is determined from an angular average of the position of the different users appearing on the image. Thus, a bearing angle $\beta$ is calculated for each face detected from the x-axis linked to said face by:

$$\beta = \tan^{-1}\left(\frac{2x}{W}\tan\frac{\alpha}{2}\right)$$

The optimal bearing angle $\beta_{opt}$ is thus given by the average of the different bearing angles $\beta$. According to a third option, the optimal bearing angle $\beta_{opt}$ is determined from the minimum x-axis $X_{min}$ and maximum x-axis $X_{max}$ linked to the detected faces.

To this end, the bearing angles $\beta_{min}$ and $\beta_{max}$ are calculated, corresponding with the formula:

$$\beta_{min} = \tan^{-1}\left(\frac{2x_{min}}{W}\tan\frac{\alpha}{2}\right)$$

$$\beta_{max} = \tan^{-1}\left(\frac{2x_{max}}{W}\tan\frac{\alpha}{2}\right)$$

The optimal bearing angle $\beta_{opt}$ is thus defined as being the average of $\beta_{min}$ and $\beta_{max}$.

During a third step 325, which is optional, the installation (and, in this case, the decoder equipment 10) determines, from the list of coordinates established in the first step 310, a dispersion angle $\delta$ which characterises the dispersion of the different users present on the image.

FIG. 2 represents such a dispersion angle $\delta$. This is an angle $\delta$ extending between two axes 13, 14 belonging to one same horizontal plane and each crossing the axis 11 of the image acquisition device 120, the two axes 13, 14 moreover passing through respectively the first and the second of the two users present farthest away from one another (on the image) of all the users present on the image.

The dispersion angle $\delta$ thus defines the width of the zone wherein it is sought that the sound broadcast by the audio playback unit has a maximum quality.

Preferably, the dispersion angle $\delta$ is linked to a standard deviation of the different positions of the users appearing on the image.

According to a first option, the dispersion angle $\delta$ is determined from a spatial standard deviation of the position of the different users appearing on the image. Thus, a standard deviation $\sigma$ of the x-axis linked to the detected faces is calculated. Then, the dispersion angle $\delta$ is calculated with the following formula:

$$\delta = 2\times\tan^{-1}\left(\frac{\sigma}{W}\tan\frac{\alpha}{2}\right)$$

This first option gives good results when the users are all close to the axis 11 of the image acquisition device 120, but the inventors have been able to observe that the dispersion becomes overevaluated when certain users are on the edges of the image.

Thus, according to a variant of the first option, preferably the dispersion angle $\delta$ is calculated with the following formula:

$$\delta = 2\times\left||\beta| - \tan^{-1}\left(\frac{2|\overline{x}| - \sigma}{W}\tan\frac{\alpha}{2}\right)\right|$$

According to a second version, the dispersion angle $\delta$ is linked to an angular standard deviation of the different users appearing on the image. Thus, a bearing angle $\beta$ is calculated for each face detected from the x-axis linked to said face as indicated above.

The dispersion angle $\delta$ is thus defined as being the standard deviation of said bearing angles $\beta$ of the detected faces.

According to a third option, the dispersion angle $\delta$ is determined from the minimum x-axis $x_{min}$ and maximum x-axis $x_{max}$ linked to the detected faces. The bearing angles $\beta_{min}$ and $\beta_{max}$ are calculated as indicated above, then the dispersion angle $\delta$ is defined as being the difference of said bearing angles:

$$\delta=\beta_{max}-\beta_{min}$$

During a fourth step 330, the installation (and, for example, the decoder equipment 10, like for example its processing means) provides a magnitude characteristic of the optimal bearing angle $\beta_{opt}$ to the mixing means. The magnitude characteristic of the optimal bearing angle $\beta_{opt}$ is, in this case, directly the value of the optimal bearing angle $\beta_{opt}$ calculated from the second step 320. Moreover, a magnitude characteristic of the dispersion angle $\delta$ is also provided to the mixing means. The magnitude characteristic of the dispersion angle $\delta$ is, in this case, directly the value of the dispersion angle $\delta$ calculated in the third step 325.

The optimal bearing angle $\beta_{opt}$ and the dispersion angle $\delta$ therefore constitute, in this case, the incoming data of the mixing means.

It is understood that these incoming data are determined only by the installation, without one of the users or the person having implemented the installation does not need to intervene.

In a manner known per se, the mixing means then adapt the distribution of the channels of the audio stream according to at least these incoming data. Preferably, the mixing means adapt the distribution of the channels of the audio stream according to at least these incoming data and the relative position of the audio playback equipment in the decoder equipment 10.

Therefore, it is retained that it is not necessary to modify the current mixing means to implement the method of the invention, since the mixing means already operated from incoming data provided by the user. The invention however provides them with incoming data different from those current and more interesting data. These incoming data provided by the invention can replace and/or complement incoming data usually provided to the mixing means.

Preferably, the previous step of acquiring an image of the room is carried out at regular intervals. For example, this step is carried out at an interval of between and 3 seconds, and for example, of between 0.5 and 2 seconds, and for example, of between 1 and 1.5 seconds and is, for example, 1 second.

The different steps described above 310, 320, 325, 330 are consequently themselves implemented at regular intervals (for example, the same as that of image acquisition). Optionally, the different steps 310, 320, 325, 330 described above are implemented, so as to determine a new optimal bearing angle $\beta_{opt}$ and a new dispersion angle $\delta$ for each new image transmitted to the analysis means. In this way, the mixing means adapt the distribution of the channels of the audio stream regularly.

The method described therefore enables a dynamic adaptation of the audio stream retransmitted to the users.

Other options can be considered.

According to a first option, the method which has been described, also considers the attention of the user(s) present on the image to manage the audio stream.

According to a first proposal, the method which has been described, also considers the attention of the user(s) present on the image to manage the audio stream, and for example, to calculate the optimal bearing angle $\beta_{opt}$ According to a first option, the method considers the orientation of the head of the users present on the image to determine the optimal bearing angle $\beta_{opt}$.

Particularly, a user is considered as very attentive, if they are rotated towards the installation, in particular towards the decoder equipment 10. Typically, the user will appear, in this case, from the front on the image. However, if the user is barely attentive, they will be seen in profile on the image. Moreover, it can be noted that the users who rotate the back to the installation are already implicitly ignored, since their face cannot be seen on the image.

According to this first option, the analysis means are configured to not only detect a user on an image, but also locate their eyes and their mouth. For example, the analysis means are based on the BlazeFace neural network already mentioned or in a variant of the Viola-Jones method such as, for example, that described in the article, "Face Detection Using Modified Viola Jones Algorithm", A. Gupta, Dr R. Tiwari—International Journal of Recent Research in Mathematics Computer Science and Information Technology 2015 (http://www.paperpublications.org/upload/book/Face%20Det ection%20Using%20Modified%20Viola%20Jones %20Algorithm-164.pdf)

It is known that, for a face from the front, the triangle formed by the eyes and the middle of the mouth is an equilateral triangle. Thus, when the face rotates, the distance between the eyes on the image decreases until reaching 0 for a face in profile.

Consequently, the installation (and, for example, the decoder equipment 10) measures, for each face detected on the image, the ratio between the interocular distance and the eyes-mouth distance and assigns a weight to each face according to this ratio.

For example:

$$w = \frac{2 \times d(LE, RE)}{d(LE, M) + d(RE, M)} + w_0$$

or also:

$$w = \frac{d(LE, RE)}{\max(d(LE, M), d(RE, M))} + w_0$$

With, for the two formulas:

w the weight assigned to a face present on the image,

LE, RE and M the respective positions of the left eye, right eye and the mouth of said face in the image, d(P,Q) means the distance between the points P and Q, and $w_0$ is a predetermined constant which means the weight assigned to the profile faces (for example, $w_0=0$ or $w_0=0.25$ can thus be chosen).

The optimal bearing angle $\beta_{opt}$ (and optionally the dispersion angle $\delta$) is thus determined by considering the weight of each face present on the image. For example, the optimal bearing angle $\beta_{opt}$ is linked to an average weighted by the weights of each face present on the image (instead of being linked to a direct average). For example, the dispersion angle $\delta$ is linked to a standard deviation weighted by the weights of each face present on the image (instead of being linked to a direct standard deviation).

According to a second option, the method detects a potential sleepiness of the users present on the image to determine the optimal bearing angle $\beta_{opt}$ The prior art comprises numerous methods for detecting drowsiness, in particular in order to detect the attention level of motor vehicle drivers. Therefore, for example, the following article can be referred to, "A Deep Learning Approach To Detect Driver Drowsiness", M. Tibrewal, A. Srivastava, Dr R. Kayalvizhi—International Journal of Engineering Research & Technology—2021 (https://www.ijert.org/a-deep-learning-approach-to-detect-driver-drowsiness). Thus, for each face detected on the image, it is determined if the user is drowsy or not, and the coordinates associated with the drowsy users are removed from the list obtained from the first step 310. Alternatively, a lower weight is attributed for drowsy users, than for other users. For example, a weight w divided by two with respect to the weight calculated according to one of the two formulas indicated above is attributed to drowsy users.

According to a second option (which could be combined with the first), the method which has been described further considers the mobility of the users present on the image to manage the audio stream, and for example, to calculate the dispersion angle $\delta$ (in order, optionally, to have a greater dispersion angle $\delta$ if one or more users move rapidly).

For example, the installation (and, for example, the decoder equipment 10) concatenates the lists obtained from the first step 310 for several successive images (for example, for the N last images, N being between 5 and 15, N being, for example, equal to 10). Then, the second step 320 and the third step 325 are executed by using the concatenated list.

According to another example, the installation (and, for example, the decoder equipment) creates two lists: one list corresponding to the faces detected in the last image captured and one concatenated list corresponding to the N last images (for example, N being between 5 and 15, N being, for example, equal to 10). Then, the optimal bearing angle $\beta_{opt}$ is determined from the list linked to the last image captured and the dispersion angle $\delta$ is determined from the concatenated list. Subsequently, the playback quality of the sound is optimal for the current position of the users, but the size of the optimal listening zone is adapted to their mobility in order to maximise the playback quality of the sound if they move.

According to a second proposal (which could be combined with the first proposal), the method which has been described, also considers the attention of the user(s) present on the image to manage the audio stream, and for example, to calculate an incoming datum other than the optimal bearing angle $\beta_{opt}$.

Thus, according to a third option (which could be combined with the first or with the second option), the method which has been described considers, to manage the audio stream, the distance from the users to the installation and, more specifically, in this case, to the decoder equipment 10.

According to this third option, the image analysis means are configured to not only detect a user on an image, but also to locate their eyes and their mouth. For example, the analysis means are based on the BlazeFace neural network or on the variant of the Viola-Jones method.

Then, for each detected user, the distance of the user is estimated by the following formula:

$$dist = \frac{d(ME, M)}{d_{ref}}$$

With:

- dist the distance in metres between the detected user and the image acquisition device 120,
- ME is the position of the median point between the two eyes,
- M is the position of the mouth,
- d(ME,M) means the distance in pixels between the mouth M and the median point between the two eyes ME,
- $d_{ref}$ is a predetermined constant corresponding to the value of d(ME,M) for a person of average height (for example, 1.70 metres) located at a given distance from the image acquisition device 120 (for example, at a distance of 1 metre). For example, $d_{ref}$=40 pixels/metre is chosen.

An incoming datum linked to this distance is thus provided to the mixing means. This incoming datum can, for example, make it possible for the mixing means to adjust the sound level generated by each piece of audio playback equipment and/or to refine the way in which the sound is transcribed vis-à-vis the position of the user(s) in the given place (the farther a user is from the installation, the smaller the deviation between the audio playback equipment will seem to them: the mixing means can consider, to consequently exaggerate the spatialization effect for one same subjective rendering for the user).

For example, an incoming datum characteristic of a first average of the estimated distances is provided to the mixing means. The incoming datum is directly said first average or is a datum characterising the geometry of the audio playback equipment in the installation and linked to said first means.

In replacement or complementarily, the distance of each user is estimated, then a second average is calculated, weighted (see the options for calculating the abovementioned weights w) of the estimated distances for all the users present on the image. The incoming datum is directly said second average or is a datum characterising the geometry of the audio playback equipment in the installation and linked to said second average.

Naturally, the invention is not limited to the embodiments described above, and embodiment variants can be applied thereto without going beyond the scope of the invention such as defined by the claims.

The invention will thus apply to any installation enabling a sound playback of an audio stream and integrating an image acquisition device. Preferably, the installation will enable a multichannel sound playback of an audio stream.

The installation will preferably comprise:

- At least two pieces of audio playback equipment,
- Means for receiving at least one audio stream,
- Mixing means making it possible to distribute the channel(s) of the audio stream between the audio playback equipment,
- An image acquisition device,
- Means for analysing at least one image provided by the image acquisition device, detecting from it at least one piece of information characteristic of the position of each of the users present on the image and transmitting this position information to the mixing means, such that said mixing means can distribute the channel(s) of the audio stream between the audio playback equipment in view of this information.

These different elements can be arranged within one same piece of equipment, and for example, within a piece of decoder equipment, distinct entities can form some or all of it.

The means for receiving at least one audio stream and/or the mixing means and/or the means for analysing at least one image can thus comprise, for example, a processor and/or a computer and/or a microcomputer, etc. which are common or not to some or all of all these abovementioned means.

Thus, although in this case, the decoder equipment is a set-top box, the decoder equipment can be any other equipment capable of performing audio/video decoding, and, for example, a games console, a computer, a smart TV, a digital tablet, a mobile phone, a digital television decoder, a set-top box, etc.

Likewise, although in this case, the audio playback equipment is integrated in the decoder equipment, at least one of the pieces of audio playback equipment can be a distinct element of the decoder equipment. Thus, although in this case, the audio playback equipment is speakers integrated in the decoder equipment, at least one of the pieces of audio playback equipment can be an external smart speaker or another piece of equipment provided with a speaker, for example, a soundbar. At least one of the pieces of audio playback equipment can thus be moved from the decoder equipment in the place where the users move, and not arranged in or in the immediate proximity of the decoder equipment, at least one piece of information on the position of the moved audio playback equipment will thus be provided to the mixing means (for example, during the placing of the installation or during a previous calibration step).

Figure 4:
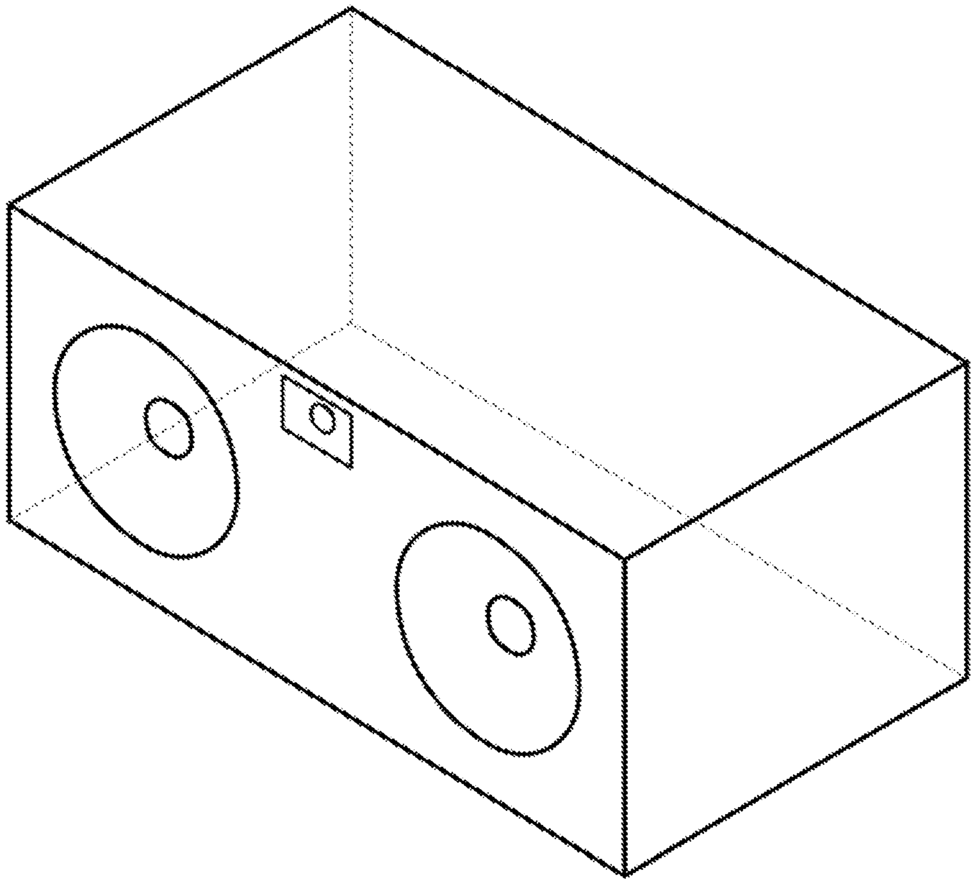
FIG. 4 represents an installation according to a second embodiment of the invention.

A different number of pieces of audio playback equipment than what has been indicated can be had. For example, in reference to FIG. 4, the installation can comprise two pieces of audio playback equipment. For example, the two pieces of audio playback equipment can be integrated in the decoder equipment. Optionally, the decoder equipment is equipped with two pieces of audio playback equipment which are arranged on one same flank of said decoder equipment, at each of the longitudinal ends of said flank. For example, the image acquisition device is arranged on the same flank as that integrating the two pieces of audio playback equipment and is arranged between said two pieces of audio playback equipment.

Likewise, the number of channels of the incoming audio stream can be different from what has been indicated. The audio stream can thus comprise one single channel, two channels, three channels, four channels, seven channels, etc.

Moreover, the ratio between the channels of the audio stream and the number of pieces of audio playback equipment can be different from what has been indicated. For example, there can be more audio playback equipment than channels in the incoming stream. Optionally, the installation can comprise a virtualisation system (integrated, for example, in the mixing means and/or in the decoder equipment) making it possible to generate additional channels from the number of initial channels, in order to ensure that each piece of audio playback equipment can broadcast sound.

Although in this case, the faces of the users are detected on the images, in replacement or complementarily, this can be other parts of the body of the users which can be detected, like for example, the torso of the users.

Although in this case, the dispersion angle and the optimal bearing angle are determined in successive steps, said angles can be determined simultaneously during one same step.

Although in this case, the optimal bearing angle is directly transmitted (and optionally directly the dispersion angle), a magnitude characteristic of said optimal bearing angle can be provided to the mixing means (at the same time, a magnitude characteristic of the dispersion angle). For example, one same piece of information which is characteristic both of the optimal bearing angle and the dispersion angle, can be provided to the mixing means.

Although in this case, the mixing means are based on a library, such as a Dolby ATMOS library, to distribute the channel(s) between the different pieces of audio playback equipment, the mixing means can be based on another technology. For example, the mixing means can be configured to implement the "ambisonics" method. This method indeed makes it possible to place virtual sound sources around a user by calculating gains Gil for each piece of audio playback equipment i and each source j according to a theoretical position of the user with respect to the audio playback equipment. For more details about the "ambisonics" method, the following web page can, for example, be referred to https://fr.wikipedia.org/wiki/Ambisonie and/or to the thesis *Méthodes numëriques pour* 1*a spatialisation sonore, de la simulation á* 1*a synthése binaurale* (*Digital methods for sound spatialisation, from simulation to binaural synthesis*, M. Aussal—École Polytechnique X (X Polytechnic School)—2014 (https: pastel.archives-ouvertessfr/tel-01095801

By applying this method to one of the implementations of the invention (for example, and in a non-limiting manner, to that of FIG. 4), to optionally consider the dispersion angle δ, for example several gains $G_{ij}(\beta)$ are calculated corresponding to several bearing angles β in the range going from $\beta_{opt}-\delta/2$ to $\beta_{opt}+\delta/2$ by applying the ambisonics method. Then, for each source and each audio playback equipment, a gain equal to the average $\overline{G}_{ij}$ of the calculated $G_{ij}(\beta)$ is applied. Thus, the following signals will be seen:

$$\overline{G}_{LC}\times C+\overline{G}_{GL}\times G+\overline{G}_{LD}\times D+\overline{G}_{LR}\times R$$

for the left-hand audio playback equipment $$\overline{G}_{RC}\times C+\overline{G}_{RG}\times G+\overline{G}_{RD}\times D+\overline{G}_{RR}\times R$$

for the right-hand audio playback equipment.

The installation (and, for example, the decoder equipment) can comprise a memory on which one or more sets of at least one precalculated parameter is recorded (namely, the audio parameters needing to be provided to the different pieces of audio playback equipment by the mixing means—for example, in the scope of the "ambisonics" method, the audio parameters will comprise the abovementioned gains $G_{ij}$) corresponding to several bearing angles and/or several dispersion angles. For example, on the memory, one or more sets of at least one precalculated parameter can be recorded, corresponding to several general bearing angles (for example, general optimal bearing angles taken from −60° to +60° per step of 10°—according to the optimal bearing angle actually calculated, the closest general optimal bearing angle will be estimated, and the set of corresponding parameter(s) will be applied) and/or on which one or more sets of at least one precalculated parameter is recorded, corresponding to several general dispersion angles (for example, a dispersion angle of 10° corresponding to the case of one single user and a dispersion angle of 45° corresponding to a group of several users—according to the dispersion angle actually calculated (and/or of the number of users detected on the image), the closest general dispersion angle will be estimated and the set of corresponding parameter(s) will be applied).

The installation (and, for example, the decoder equipment) can apply a filtering, in particular a time filtering, between several successive values of optimal bearing angles and/or of dispersion angles. This will make it possible to avoid undesirable effects linked to sudden changes of audio parameters transmitted by the mixing means to the different audio playback equipment and based on the optimal bearing angle and/or the dispersion angle (for example, if a face is incorrectly detected and passes its time to appear and to disappear from one image to the other). The filtering can, for example, be an average (weighted or not) of the last calculated values of optimal bearing angles and/or dispersion angle, or any other bandwidth filtering applied to the sequence of the last calculated values of optimal bearing angles and/or dispersion angle. The filtering can be a hysteresis applied on the optimal bearing angle and/or the dispersion angle (i.e. the mixing means will only modify the audio parameters if the difference between the current optimal bearing angle and the optimal bearing angle which had been used to calculate the current audio parameters, is greater than a first fixed threshold (for example, a threshold of between 2 and 10° and, for example, a threshold of 5°) and/or if the difference between the current dispersion angle and the dispersion angle which had been used to calculate the current audio parameters, is greater than a second fixed threshold (for example, a threshold of between 5 and 15° and, for example, a threshold of 10°). The filtering can be implemented by changing a set of audio parameter(s) only if several successive determinations (for example, at least two or at least three successive determinations) of optimal bearing angle and/or of dispersion angle mean a set of parameter(s) different from the active set.

Although in this case, the optimal bearing angle is based on the x-axis linked to the detected faces, the optimal bearing angle can be based on the y-axis of said detected faces, or can consider both the x-axis and the y-axis of the detected faces.

Although in this case, it is still based on one single image to estimate a value (for example, the optimal bearing angle and/or the dispersion and/or the distance from a user to the installation), it can also be based on a greater number of images (for a given number N of images) and determine, for example, the average of the values calculated for these N images. For example, this average can be provided as incoming data to the mixing means or determine an incoming datum to be provided to the mixing means from this average.

The invention claimed is:

1. A method for managing an audio stream read by at least one audio playback equipment unit comprising at least two pieces of audio playback equipment, said at least one audio playback equipment unit being arranged in a given place, comprising:

detecting on at least one image acquired by at least one image acquisition device of the given place, a user present on the at least one image and deducing from this, for the user, at least one piece of information characteristic of the position of the user in said image;

determining at least from said characteristic information, an optimal bearing angle (βopt) defined by the angle formed between:

an axis of the image acquisition device, and an axis along which a sound played back by the at least one audio playback equipment unit is propagated to reach the user present on the image, wherein the optimal bearing angle ($\beta_{opt}$) is linked to a spatial average of the position of different users appearing on the image, the optimal bearing angle being then given by the formula:

$$\beta_{opt}=\tan^{-1}(2\bar{x}/W\tan\alpha/2)$$

where:

$\bar{x}$ means an x-axis average or an y-axis average linked to each of the faces detected on the image;

$\beta_{opt}$ means the optimal bearing angle;

W means the width of the image acquired in pixels; and

α means the angle of the field of the image acquisition device in a horizontal plane, or wherein the optimal bearing angle ($\beta_{opt}$) is linked to an angular average of the position of different users appearing on the image, a bearing angle β being then calculated for each face detected from the x-axis or y-axis linked to said face by:

$$\beta=\tan^{-1}(2x/W\tan\alpha/2)$$

wherein x is the optimal bearing angle $\beta_{opt}$ being thus given by the average of said different bearing angles β, or wherein the optimal bearing angle ($\beta_{opt}$) is linked to the positions of two users farthest away from one another on the image from among the different users appearing on the image, the optimal bearing angle ($\beta_{opt}$) being determined from the minimum x-axis and maximum x-axis, or from the minimum y-axis and maximum y-axis, linked to the detected faces, by calculation of the corresponding bearing angles $\beta_{min}$ and $\beta_{max}$ with the formula:

$$\beta_{min}=\tan^{-1}(2x_{min}/W\tan\alpha/2)$$

$$\beta_{max}=\tan^{-1}(2x_{max}/W\tan\alpha/2)$$

the optimal bearing angle $\beta_{opt}$ being thus defined as being the average of $\beta_{min}$ and $\beta_{max}$; and providing mixing means distributing the audio stream between the different audio playback equipment of said at least one audio playback equipment unit, a magnitude characteristic of the optimal bearing angle, such that the mixing means distribute the audio stream at least according to said magnitude characteristic.

2. The method according to claim 1, wherein the image acquisition device generates, at regular intervals, a new image of the given place, and the optimal bearing angle value (βopt) is recalculated for each new image, such that the mixing means distribute the audio stream between the different pieces of audio playback equipment of said at least one audio playback equipment unit based on this new optimal bearing angle value.

3. The method according to claim 1, wherein the characteristic information is at least one x-axis in the image.

4. The method according to claim 1, wherein the characteristic information is a piece of information characteristic of the position of the face of the user in the image.

5. The method according to claim 1, wherein a dispersion angle (α) is also estimated, which characterizes the dispersion of different users present on the image, and a magnitude characteristic of the dispersion angle is provided to the mixing means, such that the mixing means distribute the stream at least according to said magnitude characteristic.

6. The method according to claim 1, wherein the optimal bearing angle (βopt) is estimated, also considering the attention of users present on the image.

7. The method according to claim 6, wherein the orientation of the head of the users present on the image is considered, to determine the optimal bearing angle (βopt).

8. The method according to claim 6, wherein a potential sleepiness of the users present on the image is considered, to determine the optimal bearing angle (βopt).

9. The method according to claim 1, wherein the mobility of users present on the image is considered to manage the audio stream.

10. The method according to claim 1, wherein the distance from users to an installation comprising the at least one audio playback equipment unit is also provided to the mixing means.

11. The method according to claim 1, wherein the mixing means distribute the audio stream between the different pieces of audio playback equipment of said at least one audio playback equipment unit by being based on one or more sets of at least one precalculated audio parameter.

12. The method according to claim 1, wherein the audio stream is a multichannel audio stream and the at least audio playback equipment unit comprises at least one piece of audio playback equipment less than the number of channels of the multichannel audio stream.

13. An installation to implement the method according to claim 1, comprising at least two pieces of audio playback equipment, means for receiving at least one audio stream, the mixing means making it possible to distribute the channel(s) of the audio stream between the audio playback equipment, an image acquisition device and means for analyzing at least one image provided by the image acquisition device.

14. The installation according to claim 13, wherein the installation is decoder equipment.

15. A non-transitory storage medium which can be read by a computer, on which a computer program comprising instructions which make an installation to execute the method according to claim 1 is recorded, wherein the installation comprises at least two pieces of audio playback equipment, means for receiving at least one audio stream, mixing means to distribute the channel(s) of the audio stream between the audio playback equipment, an image acquisition device and means for analyzing at least one image provided by the image acquisition device.

* * * * *